(12) United States Patent
Adams

(10) Patent No.: US 11,351,910 B2
(45) Date of Patent: Jun. 7, 2022

(54) METHOD AND SYSTEM FOR PREVENTING ITEMS SLIDING IN CARGO AREA OF VEHICLE

(71) Applicant: Jonathan M. Adams, Kissimmee, FL (US)

(72) Inventor: Jonathan M. Adams, Kissimmee, FL (US)

( * ) Notice: Subject to any disclaimer, the term of this patent is extended or adjusted under 35 U.S.C. 154(b) by 199 days.

(21) Appl. No.: 16/828,952

(22) Filed: Mar. 24, 2020

(65) Prior Publication Data

US 2020/0307463 A1    Oct. 1, 2020

Related U.S. Application Data

(60) Provisional application No. 62/825,181, filed on Mar. 28, 2019.

(51) Int. Cl.
| | | |
|---|---|---|
| *B60P 7/08* | (2006.01) | |
| *B60R 7/08* | (2006.01) | |
| *B60P 7/135* | (2006.01) | |

(52) U.S. Cl.
CPC ............ *B60P 7/0892* (2013.01); *B60P 7/135* (2013.01); *B60R 7/08* (2013.01)

(58) Field of Classification Search
CPC ........... B60P 7/14; B60P 7/135; B60P 7/0892; B60P 7/15; B60R 7/08; B60R 7/02; B60R 5/04; B60R 9/06; B60R 9/065
USPC ......... 410/94, 121, 129, 130, 132, 140, 141, 410/143, 145, 151; 296/24.4, 37.6, 39.2
See application file for complete search history.

(56) References Cited

U.S. PATENT DOCUMENTS

| | | | | |
|---|---|---|---|---|
| 4,236,854 A | * | 12/1980 | Rogers | B60P 7/15 410/121 |
| 5,215,205 A | * | 6/1993 | Behlman | B60R 7/02 224/925 |
| 5,289,941 A | * | 3/1994 | Blankenburg | B60R 7/02 206/821 |
| 6,019,410 A | | 2/2000 | Trestle et al. | |
| 6,059,496 A | * | 5/2000 | Stevens | B60P 7/08 410/19 |
| 6,077,007 A | * | 6/2000 | Porter | B60P 7/15 410/121 |
| 6,109,847 A | | 8/2000 | Patel et al. | |
| 6,138,883 A | | 10/2000 | Jackson et al. | |
| 6,692,204 B1 | * | 2/2004 | Ricard | B60P 7/0892 410/121 |
| 8,317,442 B2 | | 11/2012 | Daikuzono | |

(Continued)

*Primary Examiner* — Stephen T Gordon
(74) *Attorney, Agent, or Firm* — Jason T. Daniel, Esq.; Daniel Law Offices, P.A.

(57) ABSTRACT

An assembly for preventing items sliding around a cargo area of a vehicle. The assembly includes a plurality of first members, where a length of the first members is based on a length of the cargo area. The assembly also includes a plurality of second members connected to an inner side of the plurality of first members to couple the first members together. The assembly also includes a plurality of third members with a first end connected to an outer side of the plurality of first members. A length of the third members is selected so that a second end of the third members is configured to engage an inner side surface of the cargo area. A method is also provided for preventing items sliding around the cargo area of the vehicle.

18 Claims, 18 Drawing Sheets

(56) References Cited

U.S. PATENT DOCUMENTS

2009/0226277 A1\* 9/2009 Hill ......................... B60P 7/14
  410/130
2015/0307016 A1  10/2015 Payne \* cited by examiner

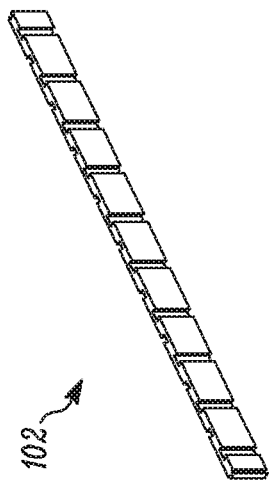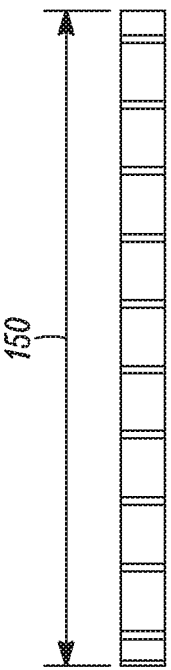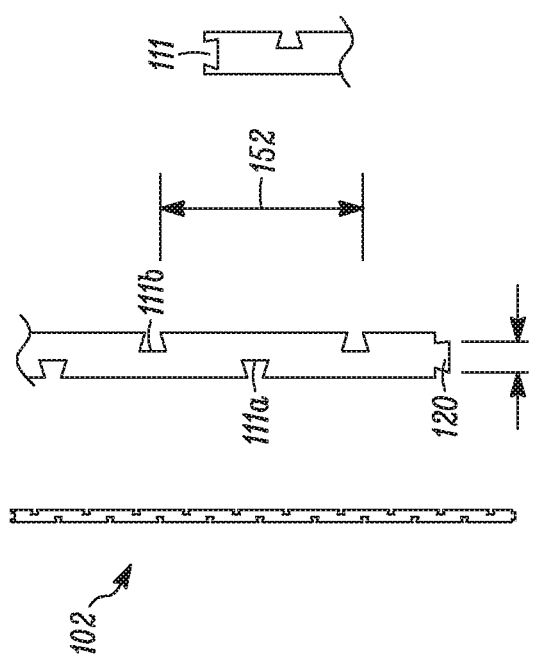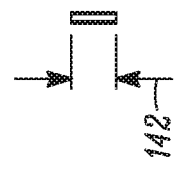

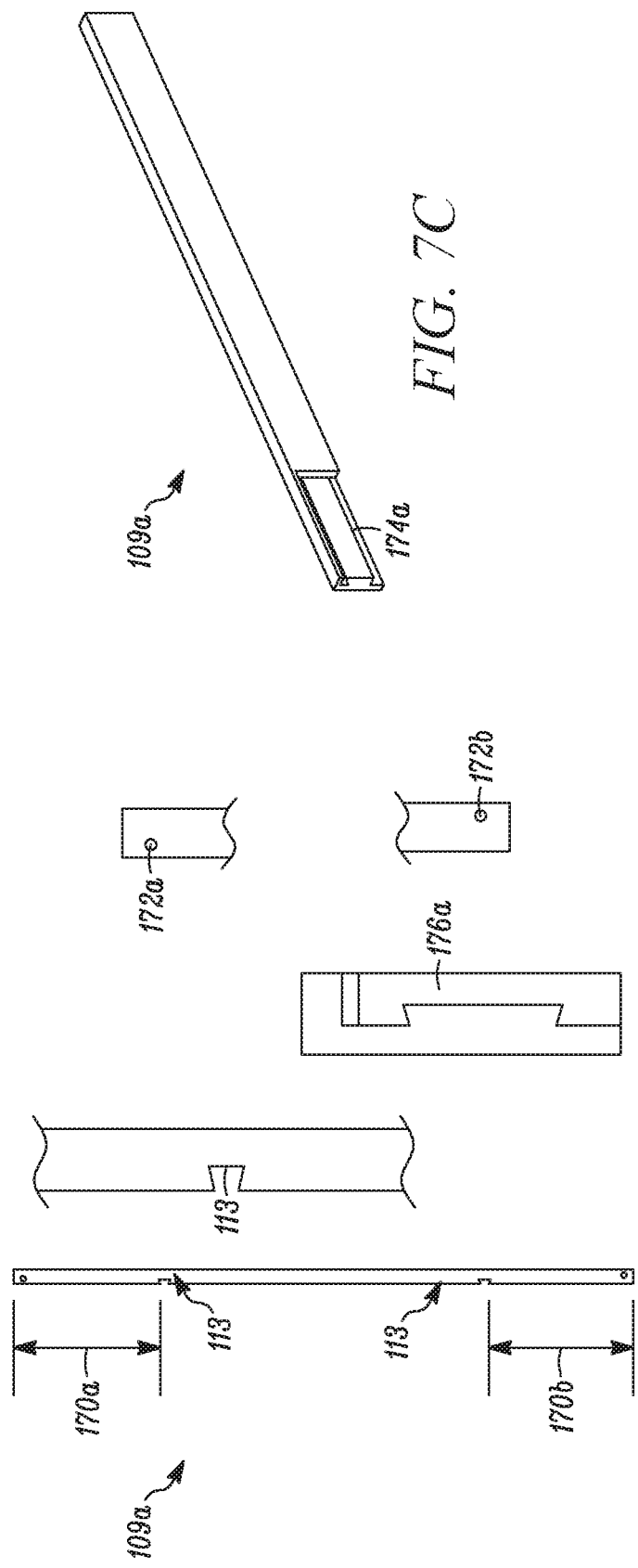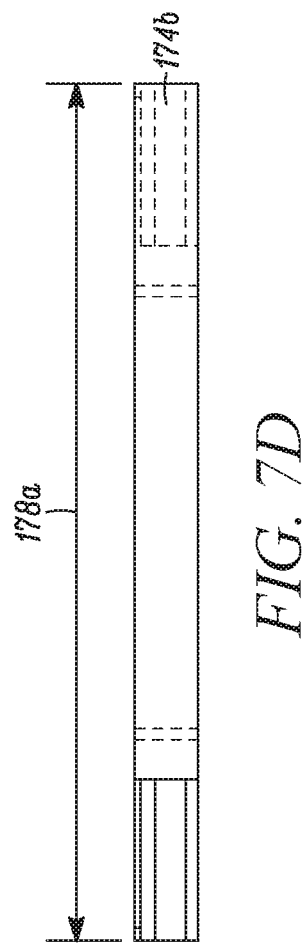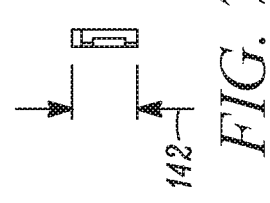
*FIG. 7C*
*FIG. 7D*
*FIG. 7A*
*FIG. 7B*

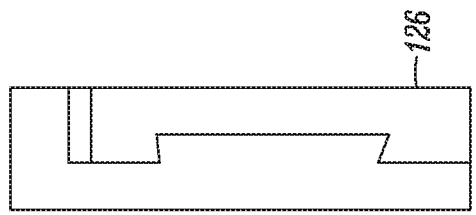
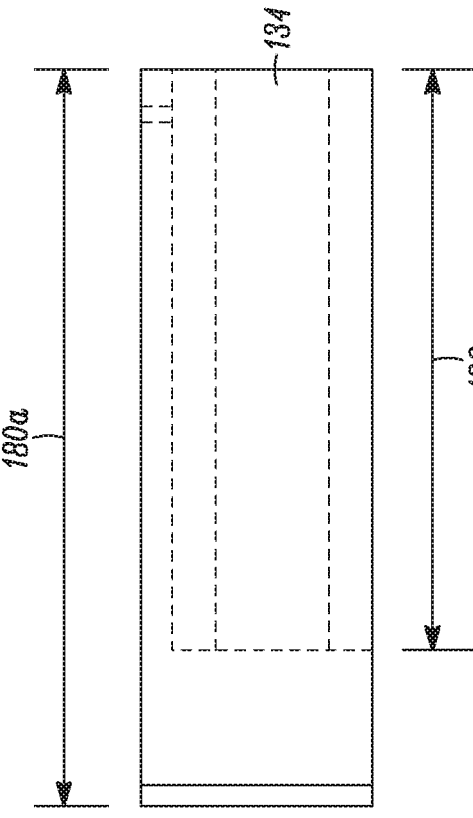
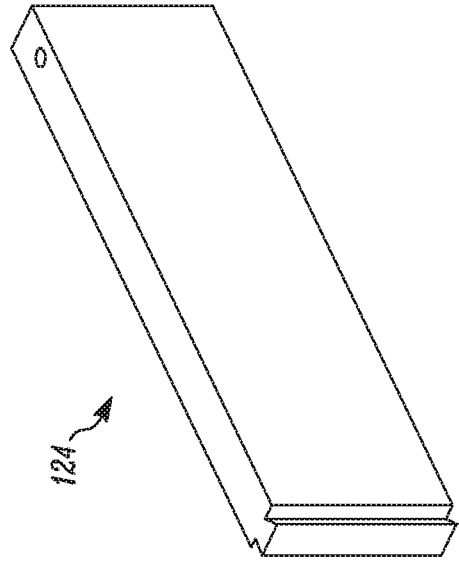
FIG. 8C
FIG. 8D
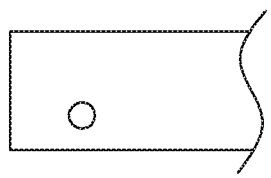
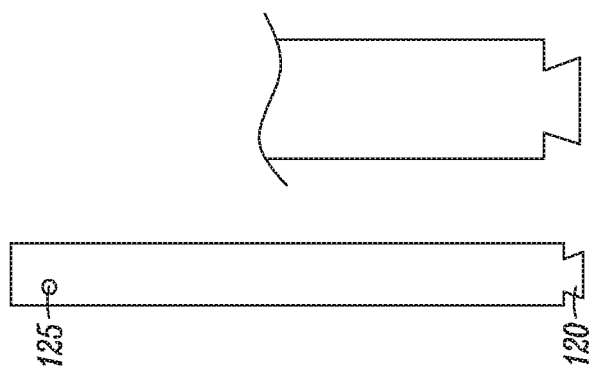
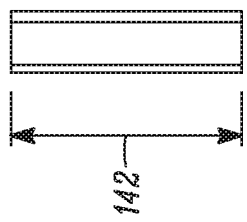
FIG. 8A
FIG. 8B

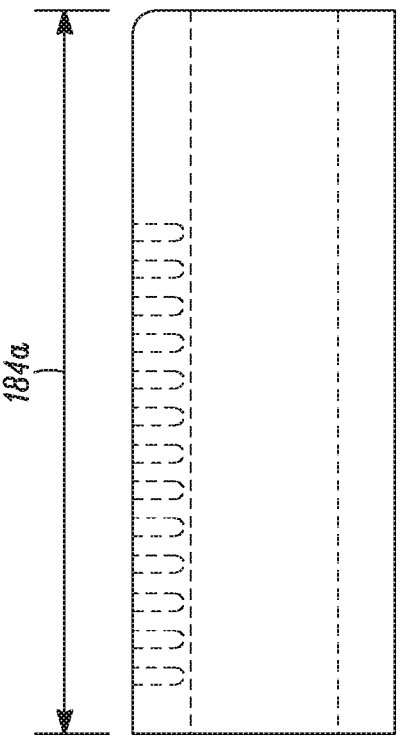
FIG. 9C
FIG. 9D
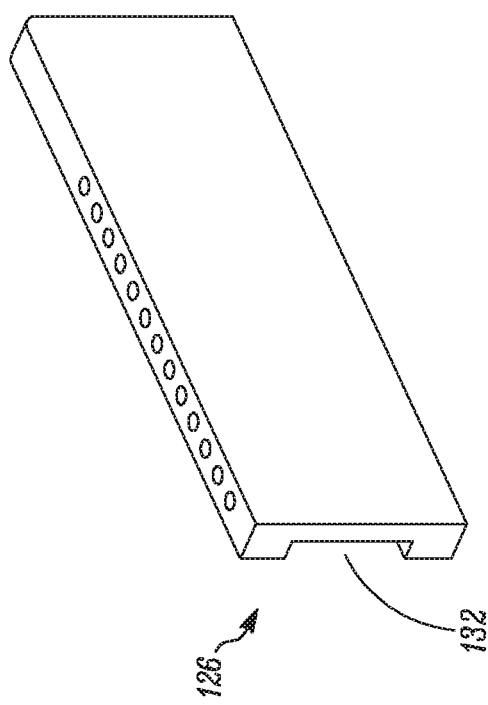
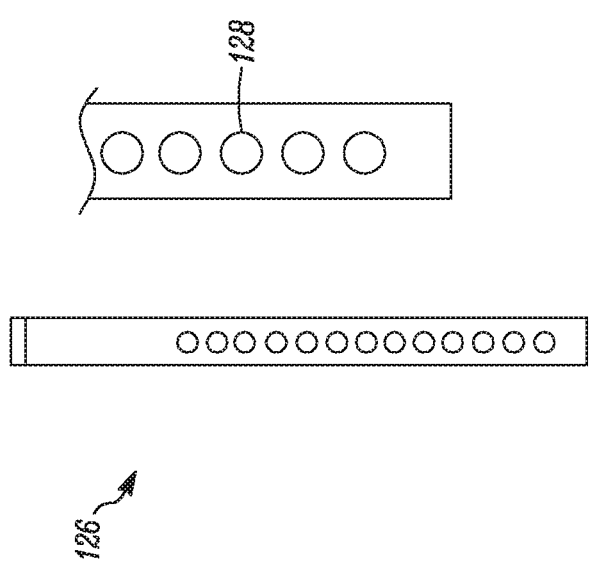
FIG. 9A
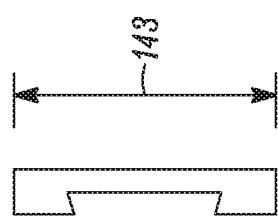
FIG. 9B

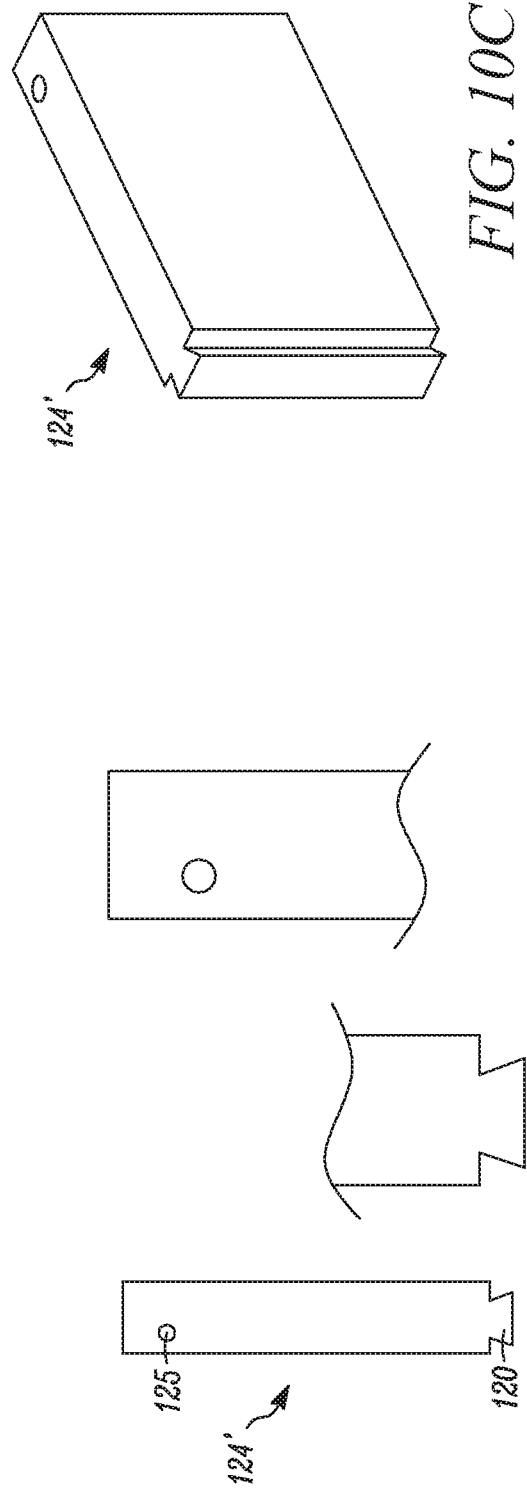
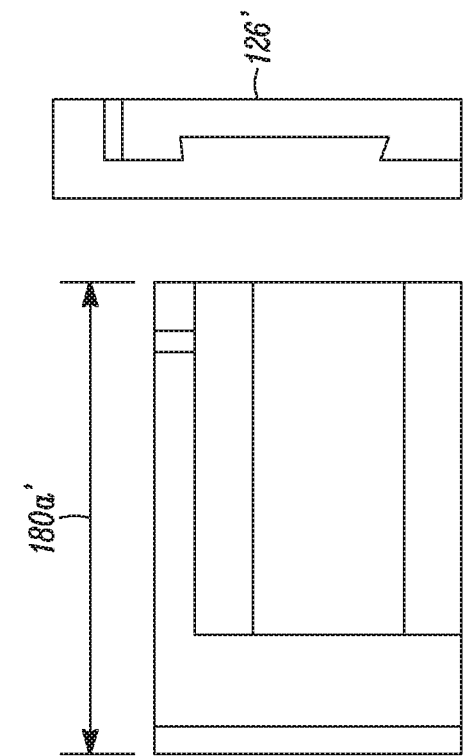
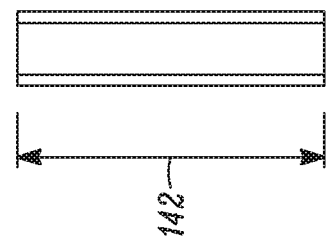

METHOD AND SYSTEM FOR PREVENTING ITEMS SLIDING IN CARGO AREA OF VEHICLE

CROSS REFERENCE TO RELATED APPLICATIONS

This application claims benefit of Provisional Application No. 62/825,181, filed Mar. 28, 2019, the entire contents of which is hereby incorporated by reference as if fully set forth herein, under 35 U.S.C. § 119(e).

BACKGROUND

Cargo areas of vehicles, such as beds of pick-up trucks are routinely used to carry cargo such as items purchased in retail stores (e.g. groceries). The user of the vehicle leaves the cargo in the cargo area and then drives the vehicle from a first location to a second location. During the transit from the first location to the second location, it is not uncommon for the cargo to move or slide around in the cargo area, which is frequently larger than the dimensions of the cargo.

SUMMARY

The current inventors have recognized that conventional systems have been developed to prevent cargo from sliding around in cargo areas of vehicles, such as truck beds. For example, U.S. Pat. No. 8,317,442 teaches cargo area partitions to divide the cargo area into smaller subdivisions into which cargo can be placed. However, the inventor of the present invention recognized several shortcomings of such a conventional system, including that the partitions extend an entire height of the cargo area and thus would have to be removed if larger cargo (e.g. pieces of timber, etc.) were needed to be placed in the cargo area. Thus, the inventor of the present invention developed an improved system which overcomes this noted drawback since it permits partitions in the cargo area to prevent smaller items from sliding around the cargo area while at the same time also does not require removal in order to place larger items that extend the length of the cargo area.

In another example, U.S. Patent Application Publication Number 2015/0307016 teaches a divider device that can be used to partition a portion of a truck bed (between the wheel wells and the tail gate) into multiple partitions so that cargo items can be placed in those partitions. However, the inventor of the present invention recognized several drawbacks with this conventional device, including that the device merely divides one portion of the cargo area into partitions and thus is limited with the extent of surface area and partitions that can be formed to hold cargo items. For example, if someone was taking a trip to the beach and placed smaller bags in the cargo area portion with the divided partitions they may not have any partitioned area to place other items (e.g. cooler). The inventor of the present invention recognized another deficiency in this conventional device based on its apparent inability to selectively dimension the partition. Thus, if cargo (e.g. small tools) were placed in a partition much larger than the cargo, the cargo would likely slide around. The inventor of the present invention overcame this deficiency by developing a structural arrangement where the partition dimensions can be sized to accommodate varied dimensions of cargo so as to ensure the cargo does not slide around within the partitions.

In a first set of embodiments, an assembly for preventing items sliding around a cargo area of a vehicle. The assembly includes a plurality of first members, where a length of the first members is based on a length of the cargo area. The assembly also includes a plurality of second members connected to an inner side of the plurality of first members to couple the first members together. The assembly also includes a plurality of third members with a first end connected to an outer side of the plurality of first members. A length of the third members is selected so that a second end of the third members is configured to engage an inner side surface of the cargo area.

In a second set of embodiments, a method is provided for preventing items sliding around a cargo area of a vehicle. The method includes selecting a plurality of first members, where a length of the first members is selected based on a length of the cargo area. The method further includes coupling the plurality of first members by connecting a plurality of second members along an inner side of the plurality of first members. The method further includes connecting a first end of a plurality of third members along an outer side of the plurality of first members. The method further includes adjusting a length of the third members so to engage a second end of the plurality of third members with an inner side surface of the cargo area.

Still other aspects, features, and advantages are readily apparent from the following detailed description, simply by illustrating a number of particular embodiments and implementations, including the best mode contemplated for carrying out the invention. Other embodiments are also capable of other and different features and advantages, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

Embodiments are illustrated by way of example, and not by way of limitation, in the figures of the accompanying drawings in which like reference numerals refer to similar elements and in which:

FIGS. 3A-3D are images that illustrate views of a center support of the assembly of FIG. 1A, according to an embodiment;

FIGS. 7A-7D are images that illustrate views of a rear middle support of the assembly of FIG. 1A, according to an embodiment;

FIGS. 8A-8D are images that illustrate views of a side piece of the assembly of FIG. 1A, according to an embodiment;

FIGS. 9A-9D are images that illustrate views of a side insert of the assembly of FIG. 1A, according to an embodiment;

FIGS. 10A-10D are images that illustrate views of a side piece of the assembly of FIG. 1A, according to an embodiment;

DETAILED DESCRIPTION

Figure 1A:
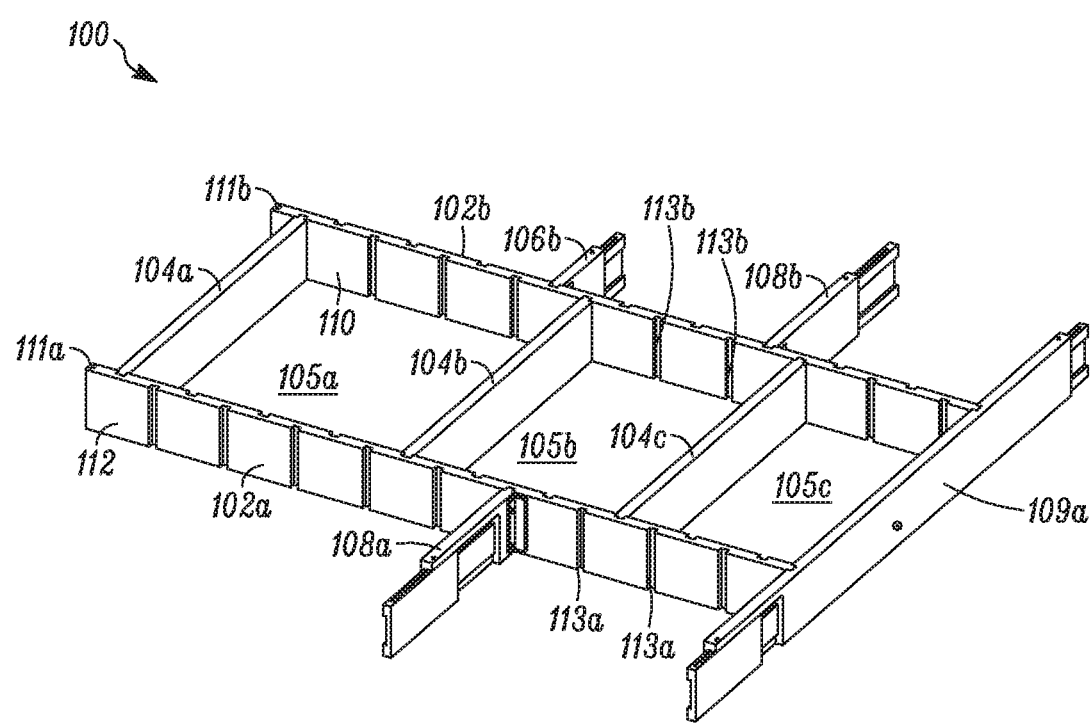
FIG. 1A is an image that illustrates an example of a top perspective view of an assembly for preventing items sliding around a cargo area of a vehicle, according to an embodiment.

A method and apparatus and system are described for preventing items sliding around a cargo area of a vehicle. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements at the time of this writing. Furthermore, unless otherwise clear from the context, a numerical value presented herein has an implied precision given by the least significant digit. Thus a value 1.1 implies a value from 1.05 to 1.15. The term "about" is used to indicate a broader range centered on the given value, and unless otherwise clear from the context implies a broader range around the least significant digit, such as "about 1.1" implies a range from 1.0 to 1.2. If the least significant digit is unclear, then the term "about" implies a factor of two, e.g., "about X" implies a value in the range from 0.5X to 2X, for example, about 100 implies a value in a range from 50 to 200. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

For purposes of this description, "items" means any pieces of cargo that can be placed in the cargo area of a vehicle for purposes of transport in the vehicle. In some embodiments, the "items" have dimensions that do not exceed one or more dimensional thresholds (e.g. height, length and/or width). For purposes of this description, "cargo area" means any area of a vehicle that is designed or intended to carry cargo, e.g. truck of a car, bed of a pickup truck, interior area of a vehicle (e.g. sport utility vehicle) with or without folding down of seats, etc. For purposes of this description, "vehicle" means any motor vehicle, such as a car, truck, sport utility vehicle (SUV), recreational vehicle (RV) or any non-motor vehicle.

Some embodiments of the invention are described below in the context of preventing items sliding around a cargo area of a vehicle. In some embodiments, the invention is described in the context of preventing items sliding around a bed of a pickup truck. In other embodiments, the invention is described in the context of preventing items sliding around an interior cargo area of a vehicle, e.g. sport utility vehicle. In other embodiments, the invention is described in the context of trunks of cars or any cargo area (interior or exterior) of any motor vehicle.

Figure 1B:
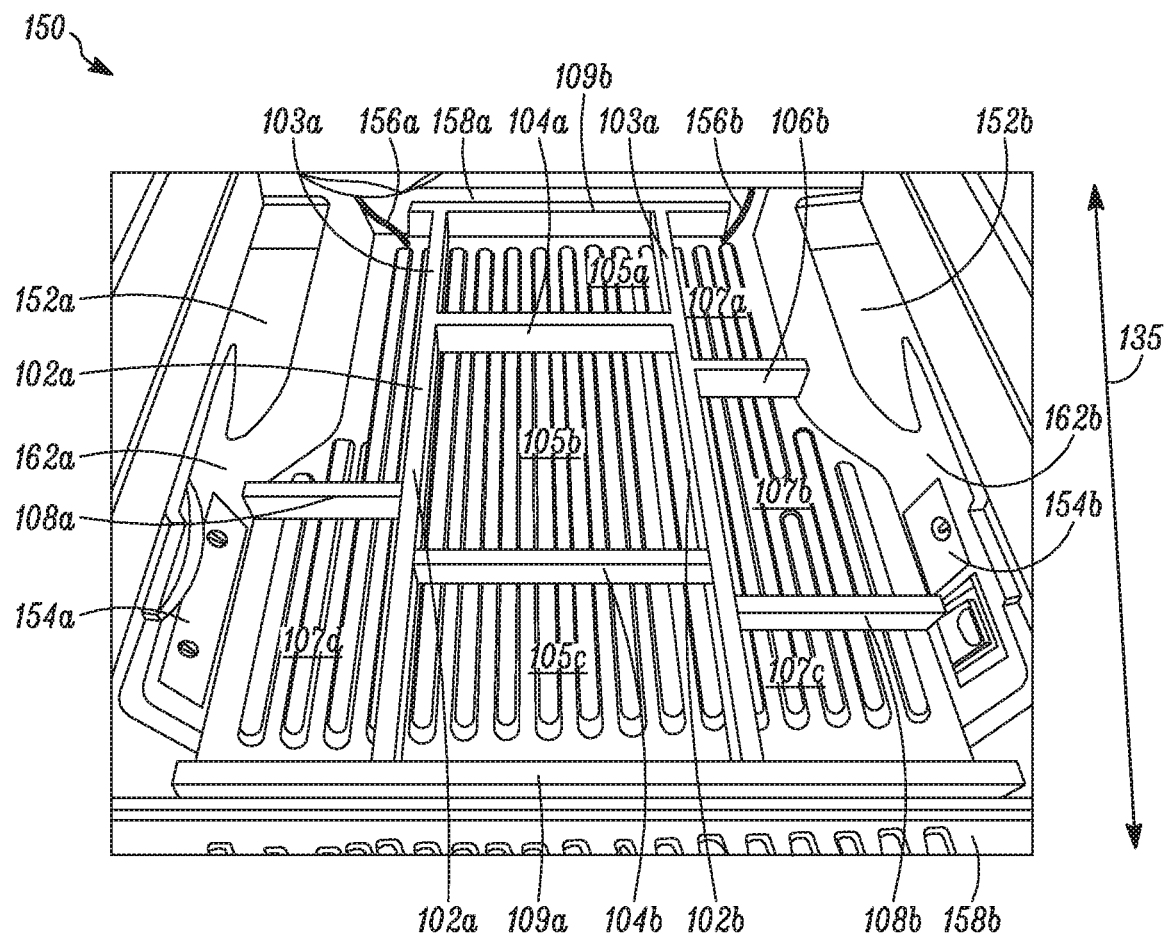
FIG. 1B is an image that illustrates an example of a top perspective view of the assembly of FIG. 1A installed in a cargo area of a vehicle, according to an embodiment.

FIG. 1A is an image that illustrates an example of a top perspective view of an assembly 100 for preventing items sliding around a cargo area of a vehicle, according to an embodiment. FIG. 1B is an image that illustrates an example of a top perspective view of the assembly 100 of FIG. 1A installed in a cargo area 150 of a vehicle, according to an embodiment. In one embodiment, the cargo area 150 is a bed of a pickup truck. In another embodiment, the cargo area is an interior cargo area of a vehicle, e.g. sport utility vehicle (SUV). In an embodiment, the apparatus 100 is made from polyvinyl chloride (PVC) material, wood, any form/grade of plastic and/or metal. In still other embodiments, the apparatus 100 or components thereof can be 3D printed (e.g. plastic material). In still other embodiments, different forms of plastic fabrication can be utilized to form the apparatus 100 or components thereof such as injection molding, rotational molding, Computer Numerical Control (CNC) fabrication or 3D printing. In an embodiment, the assembly 100 includes a plurality of first members or center supports 102a, 102b. Although a pair of center supports 102a, 102b are depicted, less or more than two center supports can be provided in the assembly. In an embodiment, the center supports 102a, 102b are selected with a length based on a length of the cargo area 150. In one embodiment a length of the center supports 102a, 102b is about equal (e.g. within about 2" or within a range from about 0.5" to about 5") to a length 135 of the cargo area 150, as depicted in FIG. 1B. In one example embodiment, the length of the center supports 102a, 102b is centered along the length 135 of the cargo area 150 so that the gap between the center supports 102a, 102b and the front and rear end surfaces 158a, 158b is about equal (e.g. within about 1").

Figure 13A:
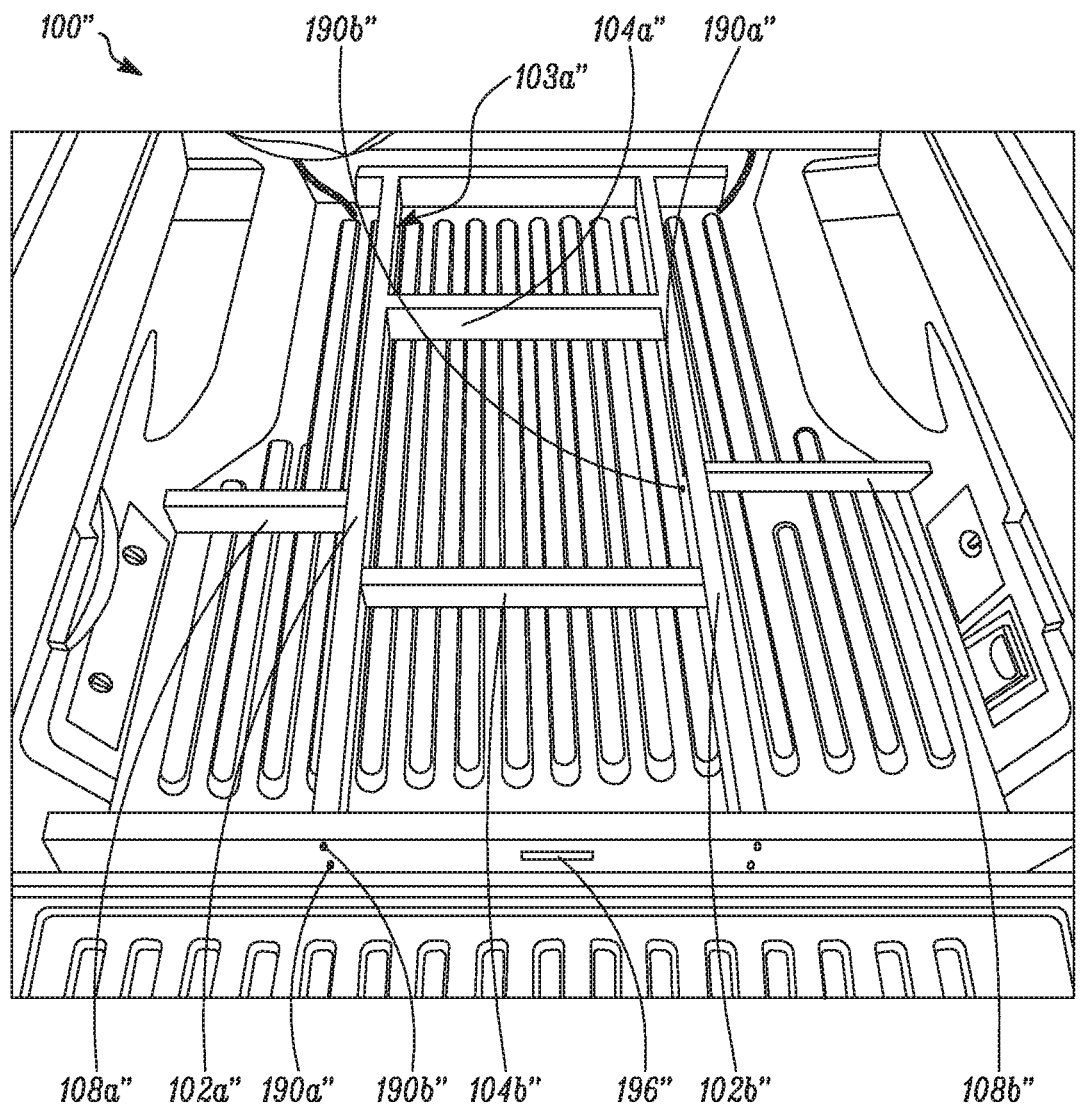
FIG. 13A is an image that illustrates an example of a top perspective view of an assembly for preventing items sliding around a cargo area of a vehicle, according to an embodiment.
Figure 14C:
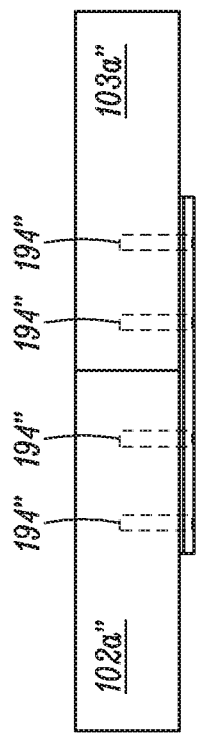
FIG. 14C is an image that illustrates an example of a top cross-sectional view of a connection between a center support and rear extension of the assembly of FIG. 13A, according to an embodiment.
Figure 14D:
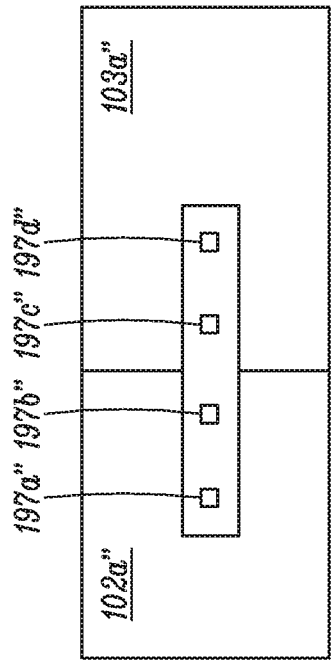
FIG. 14D is an image that illustrates an example of a front view of the connection of FIG. 14C, according to an embodiment.

In another embodiment, where a length of the center supports 102a, 102b is less than a length 135 of the cargo area 150 (e.g. more than about 1' less), a second center support or rear extension 103a or 103b is connected end-to-end to the first center support 102a, 102b (e.g. with a tongue and groove connection) so that the collective length of the first and second center supports 102a, 102b is about equal to the length of the cargo area 150. However, the apparatus 100 is not limited to connecting the center supports 102a, 102b with the rear extension 103a or 103b using a tongue and groove connection. In other embodiments, an apparatus 100" is depicted that is similar to the apparatus 100, except that the center support 102a" is connected to a rear extension 103a" (FIG. 13A) using a connector plate 196" (FIGS. 14C-14D). In this embodiment, the connector plate 196" is aligned (e.g. centered) at an end-to-end junction of the center support 102a" and the rear extension 103a". A plurality (e.g. four) of fasteners (e.g. screws) 194" are then passed through a respective plurality (e.g. four) of openings 197a", 197b", 197c", 197d" in the connector plate 196" and into the center support 102a" and rear extension 103a" to secure the center support 102a" to the rear extension 103a".

In one example embodiment, the first center support 102a, 102b has a first length (e.g. about 5') and a plurality of second center supports of varying length (e.g. about 1', about 2, and about 3') are available so to accommodate cargo areas 150 with different lengths (e.g. about 5', about 6', about 7' and about 8'). As depicted in FIG. 1A, in one embodiment grooves 111a, 111b are provided at an end of the center supports 102a, 102b to receive a tongue at an end of the second center support. As depicted in FIGS. 13A and 14C-14D, in another embodiment the fasteners 194" are secured through the openings 197a", 197b", 197c", 197d" in the connector plate 196" to secure the center support 102a" to the second center support or rear extension 103a". FIGS. 5A-5D are images that illustrate views of a second center support or rear extension 103a of the assembly 100 of FIG. 1A, according to an embodiment. As depicted in FIGS. 5A-5D, the rear extension 103a includes a tongue 120 at an end of the rear extension 103a that is sized to fit in the grooves 111a, 111b (FIGS. 3A-3D) of the center supports 102a, 102b so to provide an extension of a first length 166a (e.g. about 1') to the center supports 102a, 102b. FIGS. 6A-6D are images that illustrates views of a second center support or rear extension 103b of the assembly 100 of FIG. 1A, according to an embodiment. As depicted in FIGS. 6A-6D, the rear extension 103b includes a tongue 120 at an end of the rear extension 103b that is sized to fit in the grooves 111a, 111b (FIGS. 3A-3D) of the center supports 102a, 102b so to provide an extension of a first length 166b (e.g. about 3') to the center supports 102a, 102b. Although FIGS. 2A-11D depict numerical dimensions, these dimensions are one example of a dimension and the various components of the apparatus 100 are not limited to these particular numerical dimensions. As with the rear extensions 103a, 103b that have different length, the apparatus 100" of FIGS. 13-14 also features multiple rear extensions 103" of different length, to provide flexibility to ensure that the combination of the center support 102" and rear extension 103" securely fit within the length 135 of the cargo area 150.

In an embodiment, the assembly 100 further includes a plurality of second members or center cross members 104a, 104b, 104c that are connected to inner sides 110 of the center supports 102a, 102b to couple the center supports 102a, 102b together. Although three center cross members are depicted in FIG. 1A, in other embodiments less or more than three center cross members are provided. In an example embodiment, the center supports 102a, 102b are oriented about parallel to each other (e.g. 0 degrees±10 degrees of each other) and/or the center cross members 104a, 104b, 104c are each oriented about orthogonal (e.g. 90 degrees±10 degrees) with respect to the center supports 102a, 102b.

Figure 1C:
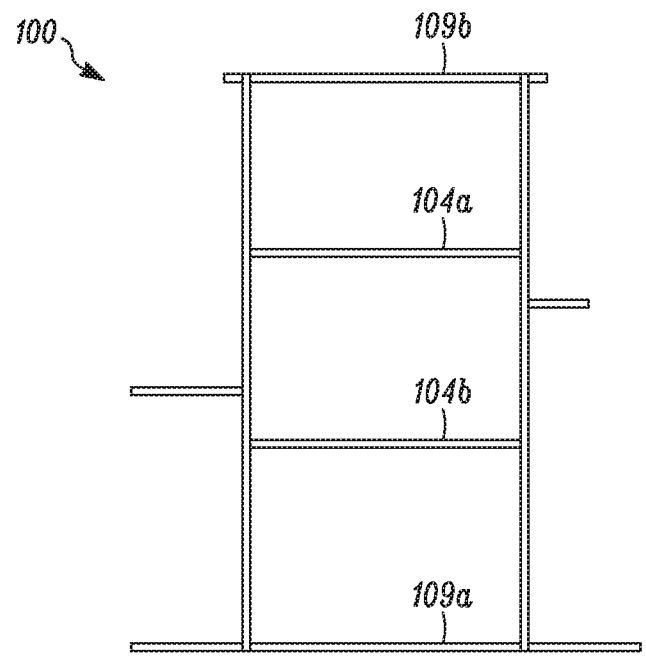
FIG. 1C is an image that illustrates an example of a top view of an assembly for preventing items sliding around a cargo area of a vehicle, according to an embodiment.
Figure 13B:
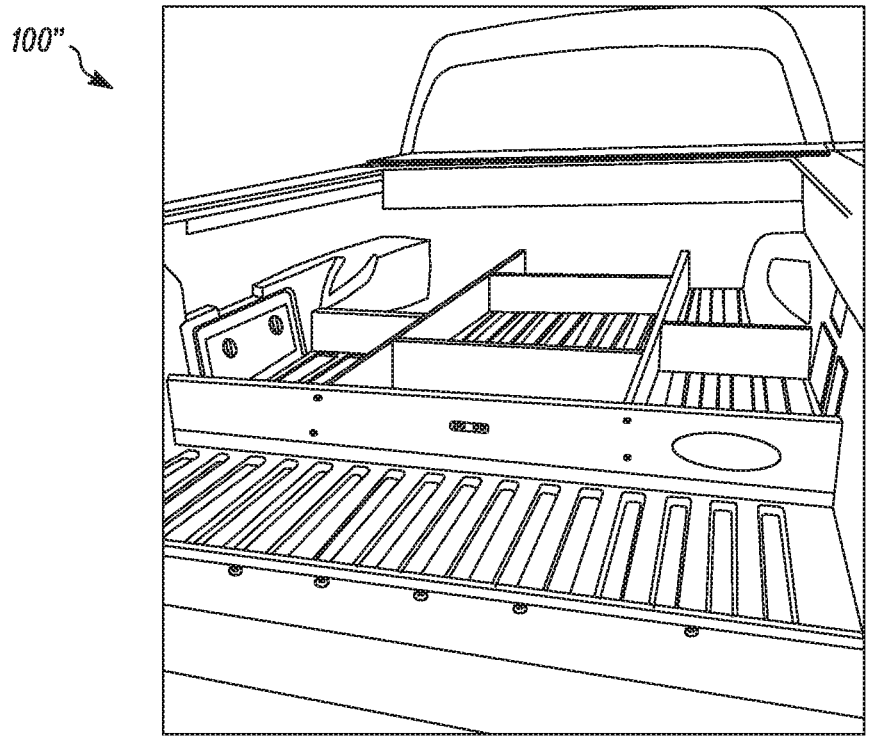
FIG. 13B is an image that illustrates an example of a rear perspective view of the assembly of FIG. 13A, according to an embodiment.
Figure 13C:
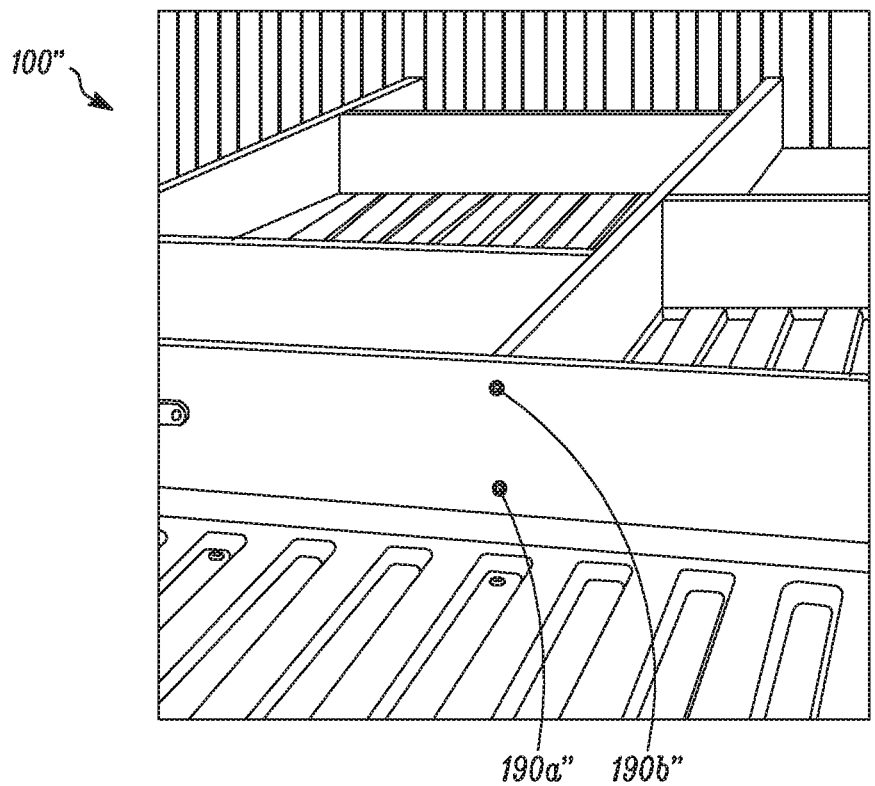
FIG. 13C is an image that illustrates an example of a partial respective view of the assembly of FIG. 13A, according to an embodiment.

FIG. 1A further depicts that center cross members 104a, 104b, 104c are removably connected to the inner side 110 of the center supports 102a, 102b with a mating engagement. FIG. 1C depicts a further view of the center cross members 104a, 104b, 104c. In one embodiment, the mating engagement is a tongue and groove arrangement. In other embodiments, any mating engagement appreciated by one of ordinary skill in the art can be employed including a slide system where a plurality of cylinders or prongs with a first diameter are positioned along the inner side 110 and the center cross members 104a, 104b, 104c are removably connected to one of the cylinders or prongs with an opening at each end of the center cross members that has an inner diameter to securely receive one of the cylinders or prongs. In yet another embodiment, screw mounted bolts or spindle rods could be mounted along the inner side 110 and a selective screw mounted bolt could be screwed into each of the center cross members 104a, 104b, 104c at the desired positions along the length of the inner side 110. In yet another embodiment, FIGS. 13A-13C depict that the center cross members 104a", 104b", 104c" can be connected to the center supports 102a", 102b" using a fastener (e.g. screw) connection.

Figure 14A:
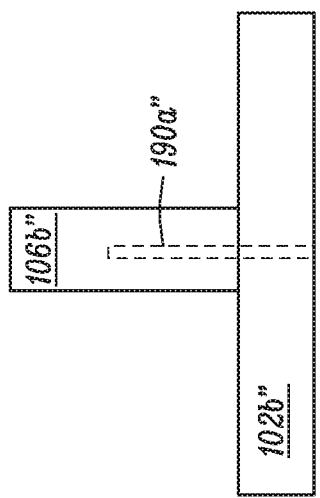
FIG. 14A is an image that illustrates an example of a top cross-sectional view of a connection between a center support and a center cross member of the assembly of FIG. 13A, according to an embodiment.
Figure 14B:
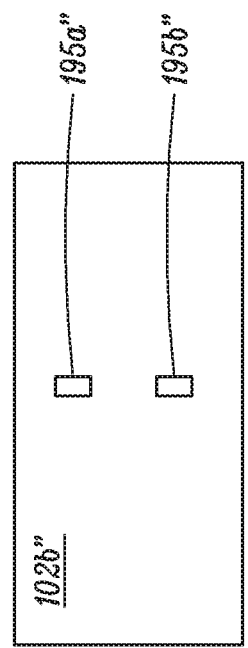
FIG. 14B is an image that illustrates an example of a front view of the connection of FIG. 14A, according to an embodiment.

In yet another embodiment, one or more spring loaded extensions can be positioned along the length of the inner side 110 and the spring loaded extensions can be activated to secure each of the center cross members 104a, 104b, 104c at the desired positions along the length of the inner side 110. In other embodiments, each tongue and groove arrangement of the apparatus 100 may alternatively use any of the above listed mating structures. The tongue and groove arrangement involves a plurality of spaced apart grooves 113b along the inner side 110 of the center support 102a, 102b. As depicted in FIG. 13A and FIGS. 14A-14B, the apparatus 100" includes a pair of fasteners 190a", 190b" (e.g. screws) that are secured through the inner side 110 of the center support 102b" and into an end of the side member 106b, to secure the side member 106b to the center support 102b", as discussed below. In this same embodiment, the center cross members 104a", 104b", 104c" are connected to the center supports 102a", 102b" using a similar connection. In an embodiment, a similar pair of fasteners 190a", 190b" are secured through the outer side 112 of the center supports 102a", 102b" and into an end of the center cross members 104a", 104b", 104c", to secure the center supports 102a", 102b" to the center cross members 104a", 104b", 104c". In an embodiment, the fasteners 190a", 190b" are secured through a pair of openings 195a", 195b" in the outer side 112 of the center supports 102a", 102b" and into an end of the center cross members 104a", 104b", 104c". The inventor realized that this screw attachment is advantageous in that it reduces the cost of manufacturing of the apparatus 100".

FIGS. 3A-3D are images that illustrates views of a center support 102 of the assembly 100 of FIG. 1A, according to an embodiment. FIGS. 3A-3D depict a regular spacing 152 between the grooves 111b along the inner side 110 of the center supports 102. In an embodiment, the regular spacing 152 is about 5" or in a range from about 3" to about 7". The spaced apart grooves 113b are provided along the inner side 110 of the center supports 102a, 102b so that a tongue 120 (FIGS. 2A-2D) at opposite ends of the center support members 104a, 104b, 104c can be received in one of the grooves 113b of each center support 102a, 102b. As depicted in FIG. 1A, the placement of the center cross members 104a, 104b, 104c in the grooves 111b along the inner sides 110 of the center supports 102a, 102b forms a plurality of interior areas 105a, 105b, 105c defined by the center supports 102a, 102b and the center cross members 104a, 104b, 104c. In one embodiment, the interior areas 105a, 105b, 105c are sized to carry items of various size and the sizing of the interior areas is achieved by the placement of the center cross members 104a, 104b, 104c in the specific grooves 113b. In another embodiment, such as the apparatus 100" of FIGS. 13A-13C and FIGS. 14A-14D, the interior areas 105" between the center supports 102a", 102b" and the center cross members 104a", 104b", 104c" can be similarly adjusted based on the placement of the openings 195a", 195b" (FIG. 14B) along the outer side 112 of the center supports 102a", 102b" (though which the fasteners 190a", 190b" are passed and into the end of the center cross members 104a", 104b", 104c". In an embodiment, the height 142 of the center supports 102a, 102b is selected to be high enough to prevent items (e.g. groceries) sliding around the cargo area 150 but not too high so to require the apparatus 100 to be removed from the cargo area 150 in order to place large items (e.g. lumber) that require placement along most or all of the cargo area 150. In an embodiment, the height 142 is about 5 inches or in a range from about 3 inches to about 7 inches and/or in a range from about 2 inches to about 9 inches. In other embodiments, one or more components of the apparatus 100 has the height 142. In still other embodiments, each component of the apparatus 100 has the height 142.

Figure 1D:
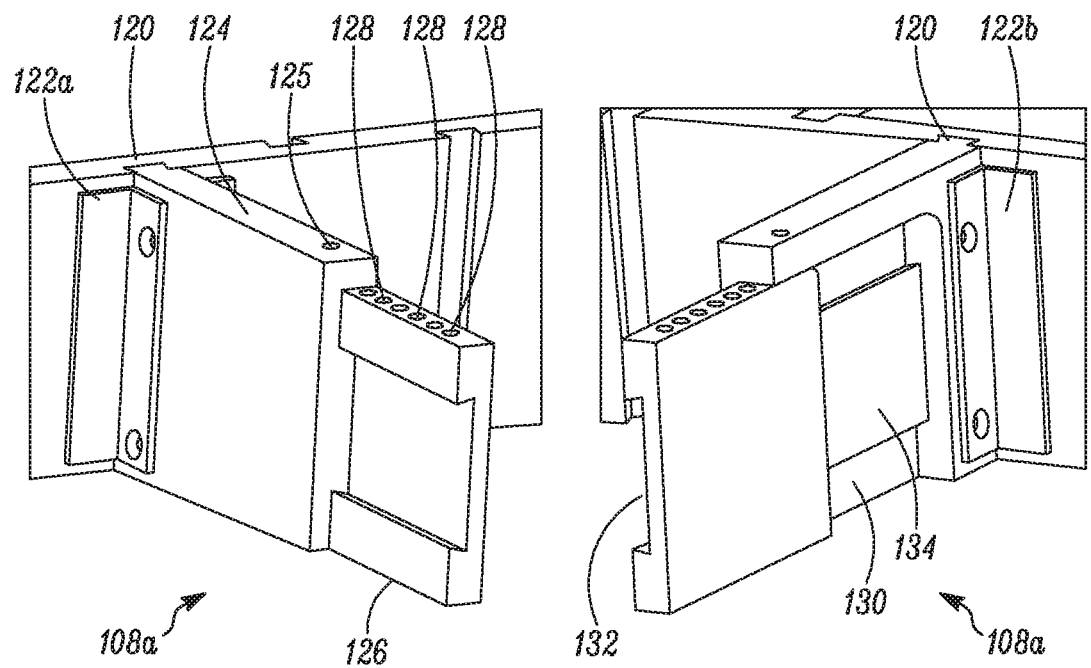
FIG. 1D is an image that illustrates an example of a side perspective view of a juncture of a side piece with a center support of the assembly of FIG. 1A, according to an embodiment.

FIGS. 1A-1B further depict a plurality of third members or side members 106b, 108a, 108b with a first end connected to an outer side 112 of the center supports 102a, 102b and where a length of the side members 106b, 108a, 108b is selected so that a second end (e.g. opposite to the first end) engages an inner side surface 162a, 162b of the cargo area 150. In one embodiment the side members 106b, 108a, 108b have an adjustable length so that the second end of the side members engages the inner side surface 162a, 162b of the cargo area 150. In one embodiment the length of the side member is adjustable by a side insert being slidably received within the side piece. FIGS. 8A-8D are images that illustrates views of a side piece 124 of the side members 108 of the assembly 100 of FIG. 1A, according to an embodiment. FIGS. 10A-10D similarly are images that illustrate views of a side piece 124' of the side members 106 of the assembly 100 of FIG. 1A. The side piece 124 which includes the groove 120 at the first end that is positioned within a groove 113a along the outer side 112 of the center supports 102a, 102b. The side piece 124 also includes a recess 130 (FIG. 1D) with a tongue 134. The side piece 124' similarly includes the groove 120 at the first end. FIGS. 9A-9D are images that illustrates views of a side insert 126 of the side members 108 of the assembly 100 of FIG. 1A, according to an embodiment. FIGS. 11A-11D similarly are images that illustrate views of a side insert 126' of the side members 106 of the assembly 100 of FIG. 1A, according to an embodiment. The side insert 126 includes a recess 132 (see also FIG. 1D) that slidably receives the tongue 134 of the side piece 124 so that the side insert 126 is slidable within the recess 130 of the side piece 124, which adjusts the length of the side members 106, 108. As further depicted in FIGS. 9A-9D, the side insert 126 includes a plurality of openings 128 along a top of the insert 126 and the side piece 124 includes a single opening 125 through which a pin (e.g. quick release pin) is inserted that passes into one of the openings 128 of the insert 126, to lock the position of the insert 126 within the side piece 124 after a desired length is achieved. Although the above embodiments discuss that the side members 106, 108 have an adjustable length using a slidable insert within a recess, in other embodiments the side members 106, 108 have an adjustable length with a slide and twist feature where the inserts are slidably received in a recess and a length of the side members 106, 108 is adjustably by a rotating member (e.g. bolt or lock) that secures the insert at a linear position of the side members 106, 106 within the recess. In yet another embodiment, on one side (e.g. top side) of the inserts a button would be provided and upon pressing the button a small lever would unlock a pointed edge of the lever on grooves or teeth on an opposite side (e.g. bottom side) of the insert. FIG. 1D depicts that in one embodiment, a pair of brackets 122a, 122b (see FIGS. 4A-4D) are used to secure the side piece 124 to the center supports 102a, 102b after sliding the tongue 120 within the groove 113a. In some embodiments, a spacing 161 of an opening in a first bracket 122a from a top of the bracket 122a (e.g. ½") is different than a spacing of an opening in a second bracket 122b from a top of the bracket 122b (e.g. 1") to ensure that fasteners passed through the brackets 122a, 122b and into the piece 124 do not overlap.

In another embodiment, the third members or side members 106b", 108a", 108b" have a fixed length rather than an adjustable length. In one embodiment the side members 106b", 108a", 108b" are provided in one of a plurality of fixed lengths, which can be selectively chosen based on a width of the cargo area 150 and/or a spacing between the outer side 112 of the center supports 102a", 102b" and the inner surface 162a, 162b" and/or wheel well 152a, 152b. In an example embodiment, FIGS. 13A-13C depict side members 106b", 108a", 108b" having a fixed length. In an embodiment, the side members 106b", 108a", 108b" are connected to the center supports 102a", 102b" by passing the fasteners 190a", 190b" through a pair of openings 195a", 195b" (FIG. 14B) in the inner side 110 of the center support 102a". The inventor recognized that one advantage of the fastener connection depicted in FIGS. 14A-14B is reduced manufacturing cost. The inventor also recognized that multiple side members of varying fixed length can be provided so that that the apparatus 100" can accommodate a variety of cargo areas 150 with varying size, depending on various factors (e.g. make and model of the vehicle, etc.).

In an embodiment, the side members include a pair of first side members 106a, 106b (note: 106a omitted from FIGS. 1A-1B for clarity but would be provided on left side of FIG. 1B in similar position as the side piece 106b) and a pair of second side members 108a, 108b with a length that is longer than the first side members. In an embodiment, the first side members 106a, 106b engage the inner side surface 162a, 164a in a first region of the cargo area 150 and the second side members 108a, 108b engage the inner side surface 162a, 162b in a second region of the cargo area 150 where the width of the cargo area 150 is greater in the second region than the first region. In an example embodiment, where the cargo area 150 is the bed of a pickup truck, the inner side surface 162a, 162b in the first region includes wheel wells 152a, 152b and/or the inner side surface 162a, 162*b* in the second region includes is between the wheel wells 152*a*, 152*b* and a tailgate 158*b*. In an embodiment, the second side members 108*a*, 108*b* are positioned along the outer 112 of the center supports 102*a*, 102*b* so that the second side members 108*a*, 108*b* do not block one or more interior compartment doors 154*a*, 154*b*. This advantageously ensures that the apparatus 100 and side members 106, 108 do not interfere with the access to interior compartment doors 154*a*, 154*b*. In an embodiment, the first side members 106*a*, 106*b* and/or second side members 108*a*, 108*b* are positioned symmetrical with respect to the left and right side of the cargo area 150 so to maximize the stability of the apparatus 100 within the cargo area 150, including during left and right turns of the vehicle.

In an embodiment, the apparatus 100 also includes one or more fourth members or middle members 109*a*, 109*b*. In an embodiment, the middle members 109*a*, 109*b* are connected to the ends of the center supports 102*a*, 102*b*. FIGS. 7A-7D are images that illustrates views of a rear middle support 109*a* of the assembly 100 of FIG. 1A, according to an embodiment. A pair of grooves 113 are provided along an interior of the length 178*a* of the rear middle support 109*a*. In an embodiment, a tongue 120 (FIG. 3D) at an end of the center supports 102*a*, 102*b* are positioned in each of the spaced apart grooves 113 of the rear middle support 109*a*. An opposite end of the center supports 102*a*, 102*b* also features a tongue that is positioned in spaced apart grooves 113 along a length of the front middle support 109*b*. As depicted in FIGS. 1A-1B, the rear middle support 109*a* is positioned at a rear of the cargo area 150 (e.g., adjacent the tailgate 158*b* in a pickup truck bed) and the front middle support 109*b* is positioned at a front of the cargo area 150. The front and rear middle supports 109*a*, 109*b* advantageously brace a front end surface 158*a* and rear end surface 158*b* (e.g. tailgate) of the cargo area 150, so to provide stability during acceleration and braking of the vehicle. Although the above embodiment discusses a tongue and groove connection between the middle members 109*a*, 109*b* and the center supports 102*a*, 102*b*, in another embodiment a fastener connection is provided between the middle members 109*a*", 109*b*" and the center supports 102*a*", 102*b*" (FIGS. 13A-13C). In this embodiment, the end of the center supports 102*a*", 102*b*" is connected to the middle members 109*a*", 109*b*" using a similar connection as between the center supports 102*a*", 102*b*" and the center cross members 104*a*", 104*b*", 104*c*" and side members 106*a*", 108*a*", 108*b*". In one embodiment, the rear middle support (positioned along a rear of the cargo area 150) includes a pair of rear middle supports 109*a*", 109*c*" that are connected together using the connector plate 196" (FIG. 13A) in a similar manner as the center support 102*a*" is connected to an end of the rear extension 103*a*".

In an embodiment, the middle members 109*a*, 109*b* each feature ends with adjustable length so that opposite ends of the middle members 109*a*, 109*b* can be adjusted to engage the inner side surface 162*a*, 162*b* of the cargo area 150 adjacent the front or rear end surfaces 158*a*, 158*b*. In an embodiment, the ends of the middle members 109*a*, 109*b* can feature a similar structure as the side members 106, 108 (e.g. slidable insert with quick release pin). In another embodiment, the length of the front middle member 109*b* is smaller than a width of the cargo area 150 at the front end surface 158*a* in order to provide space for one or more accessories (e.g. drain hoses 156*a*, 156*b* from a truck topper). In still another embodiment, a length of the front middle member 109*b*" and/or rear middle member 109*a*", 109*c*" are fixed in length and selected based on width dimensions of the cargo area 150 adjacent a respective front and rear of the cargo area 150.

Figure 1E:
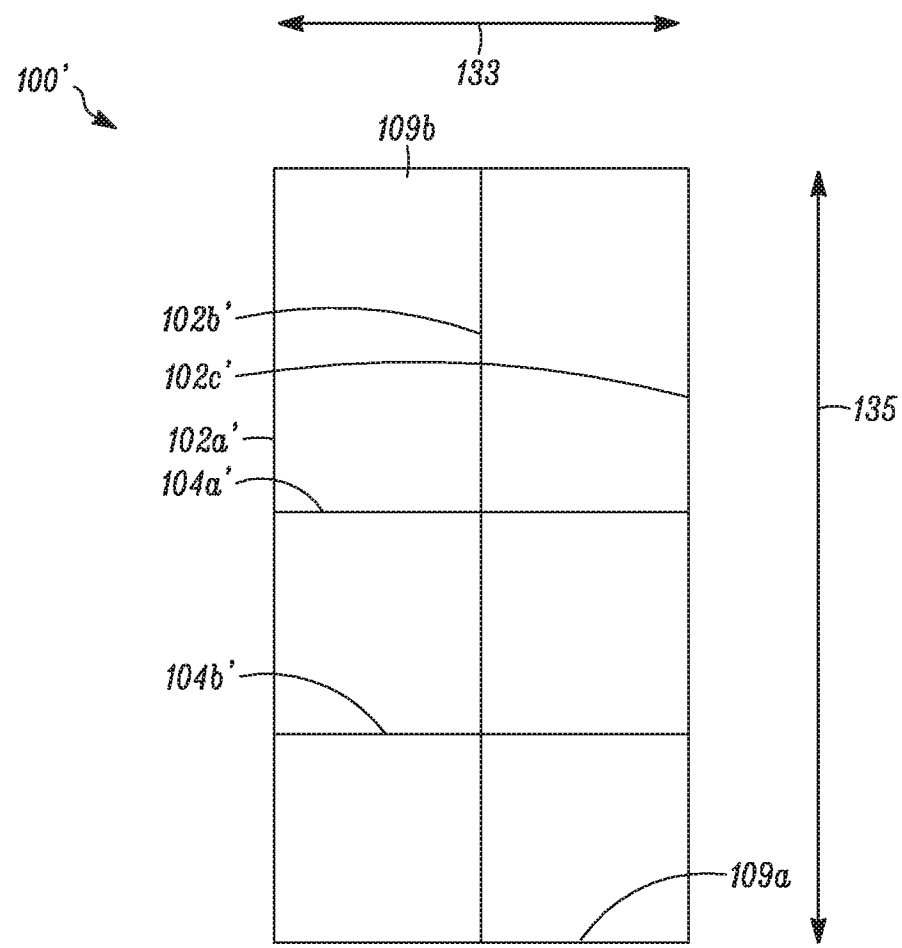
FIG. 1E is an image that illustrates an example of a top perspective view of an assembly for preventing items sliding around a cargo area of a vehicle, according to an embodiment.
Figure 2C:
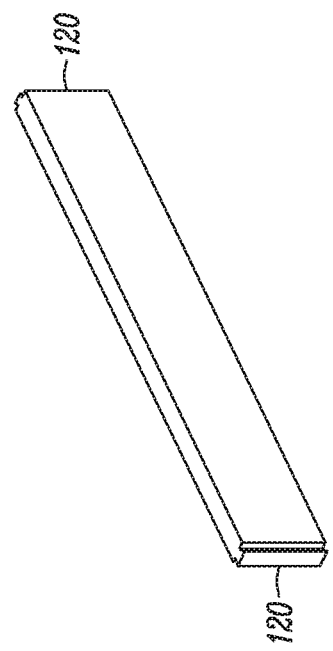
FIGS. 2A-2D are images that illustrate views of a center cross member of the assembly of FIG. 1A, according to an embodiment.
Figure 2D:
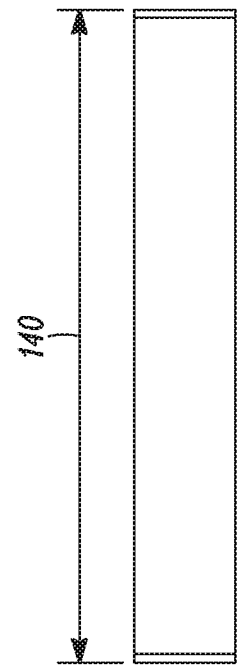
Figure 2A:
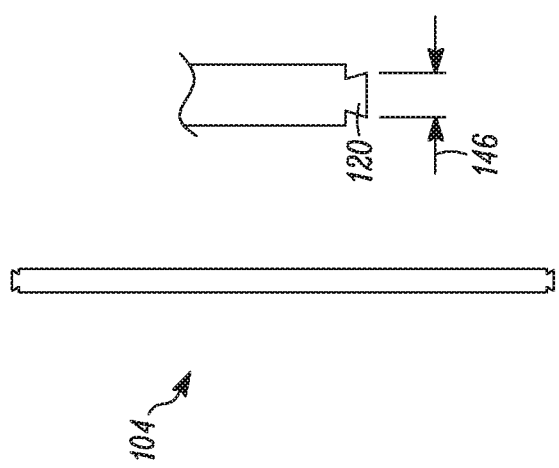
Figure 2B:
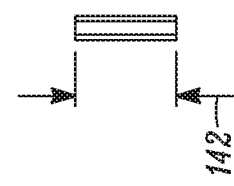
Figure 4D:
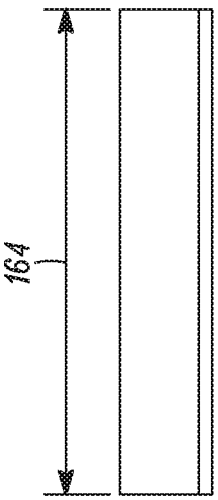
FIGS. 4A-4D are images that illustrate views of a support bracket of the assembly of FIG. 1A, according to an embodiment.
Figure 4C:
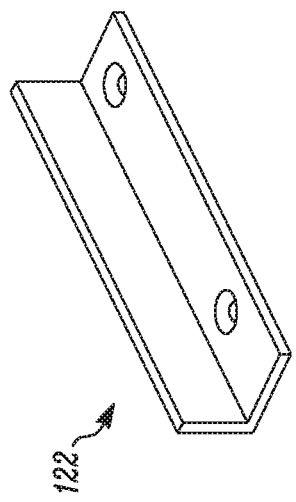
Figure 4B:
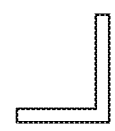
Figure 4A:
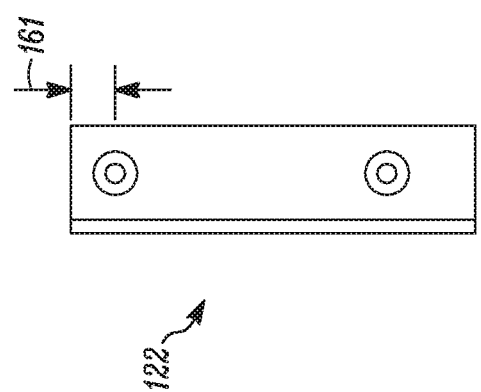
Figure 5C:
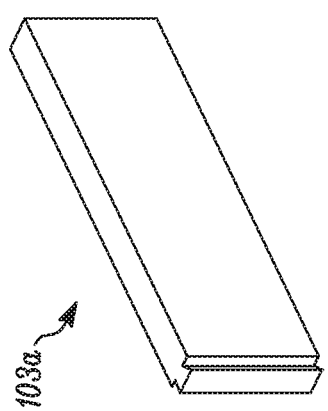
FIGS. 5A-5D are images that illustrate views of a rear extension of the assembly of FIG. 1A, according to an embodiment.
Figure 5D:
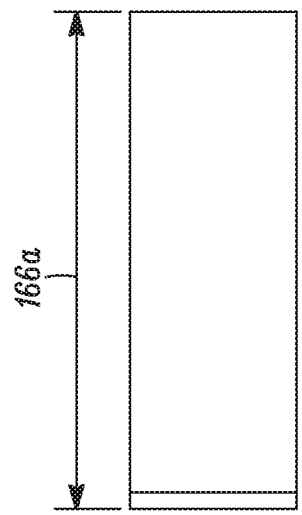
Figure 5A:
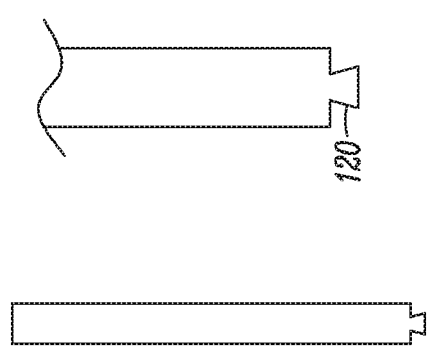
Figure 5B:
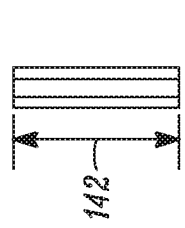
Figure 6C:
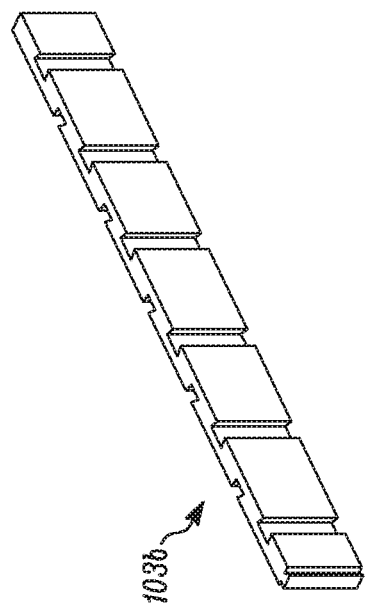
FIGS. 6A-6D are images that illustrate views of a rear extension of the assembly of FIG. 1A, according to an embodiment.
Figure 6D:
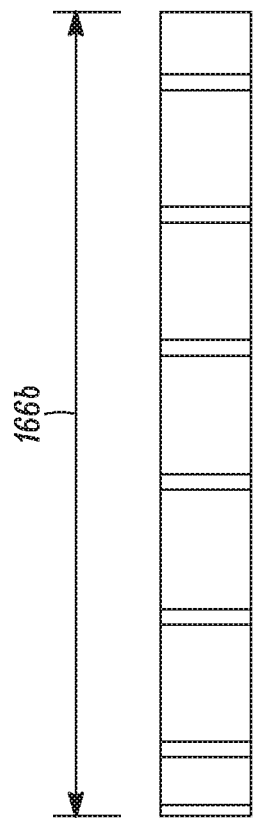
Figure 6A:
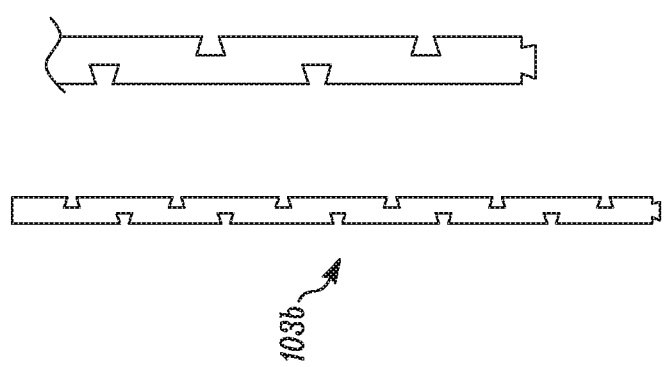
Figure 6B:
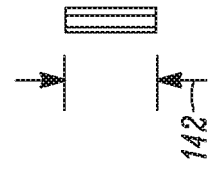
Figure 11D:
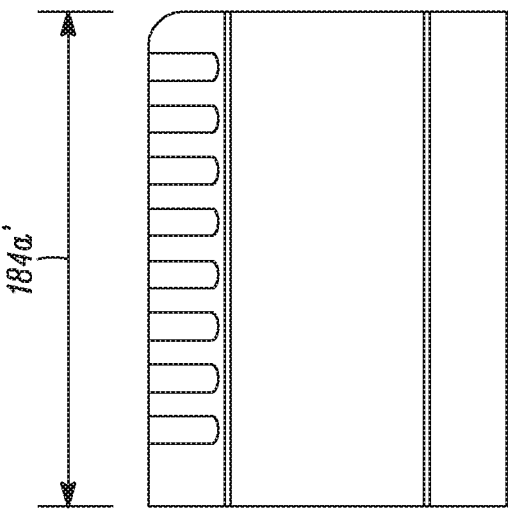
FIGS. 11A-11D are images that illustrate views of a side insert of the assembly of FIG. 1A, according to an embodiment.
Figure 11C:
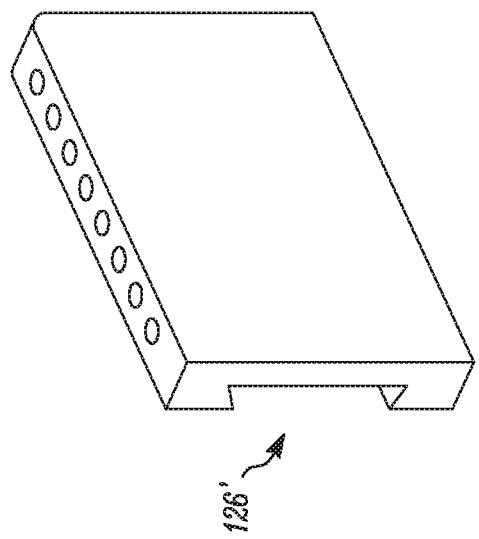
Figure 11A:
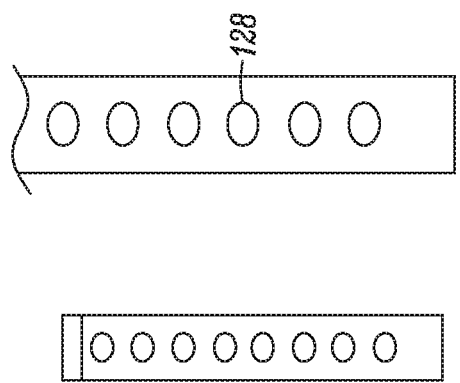
Figure 11B:
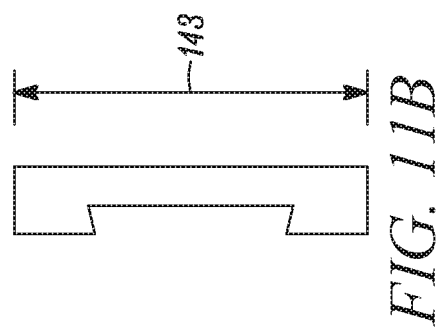

Although FIG. 1B depicts the assembly 100 being positioned in the cargo area 150 of a pickup truck, the embodiments of the invention are not limited to being used in the cargo area 150 of a pickup truck and can be used in any cargo area of any vehicle. FIG. 1E is an image that illustrates an example of a top perspective view of an assembly 100' for preventing items sliding around a cargo area of a vehicle, such as a sport utility vehicle (SUV). Unlike the apparatus 100 of FIGS. 1A-1B, the apparatus 100' is more rectangular in shape in order to fit a rectangular shaped cargo area of a SUV. It should be noted that the apparatus 100' need not be strictly rectangular but is generally rectangular in the sense that it has a length 135 and width 133 that is based on a respective length and width of the cargo area. In other embodiments, where the cargo area of the SUV (or other vehicle) has a non-rectangular interior cargo area, the apparatus 100' is formed to have a non-rectangular form based on the non-rectangular interior cargo area. In some embodiments, unlike the apparatus 100, the apparatus 100' features three center supports 102*a*', 102*b*', 102*c*', where each center support may or may not have an adjustable length (e.g. slidable insert with a quick release pin) at each end. Thus, in one embodiment, to accommodate a cargo area with a particular length, the length of the three center supports 102*a*', 102*b*', 102*c*' are adjusted so that the front and rear middle members 109*a*, 109*b* engage the front end and rear end surfaces of the cargo area. Additionally, in an embodiment, the front and rear middle members 109*a*, 109*b* as well as the center cross members 104*a*', 104*b*' have an adjustable length (e.g. slidable insert with a quick release pin) so that their length can be collectively adjusted so that they engage the inner side surfaces of the cargo area.

In another embodiment, an apparatus could be formed that is similar to the apparatus 100 but is formed as a one-piece structure (e.g. using a mold). In some embodiments, the apparatus could include an undersurface and side surfaces to engage the respective flat surface and side surfaces of the cargo area of the vehicle. In an example embodiment, the apparatus could be formed in one of a plurality of sizes, so to accommodate a respective plurality of vehicle cargo areas (e.g. a respective plurality of truck bed dimensions, a plurality of SUV interior cargo areas, etc). In still other embodiments, the apparatus includes multiple pieces (e.g. each formed using a mold) that are coupled together in the cargo area of the vehicle. In an example embodiment, the multiple pieces are operatively connected (e.g. through a mating engagement) to each other so to engage the respective flat surface and side surfaces of the cargo area of the vehicle. In one embodiment, each component of the apparatus 100 is uniquely identified with visual indicators (e.g. unique color) so that the user can easily assembly the apparatus 100. In an example embodiment, the apparatus 100 features a written set of instructions or drawing which illustrates the placement of each component of the apparatus 100 using the unique visual indicator for each component (e.g. a diagram showing the relative placement of each component of the apparatus 100 according to the unique color label on each component). This advantageously shortens the assembly time of the apparatus 100.

Figure 12:
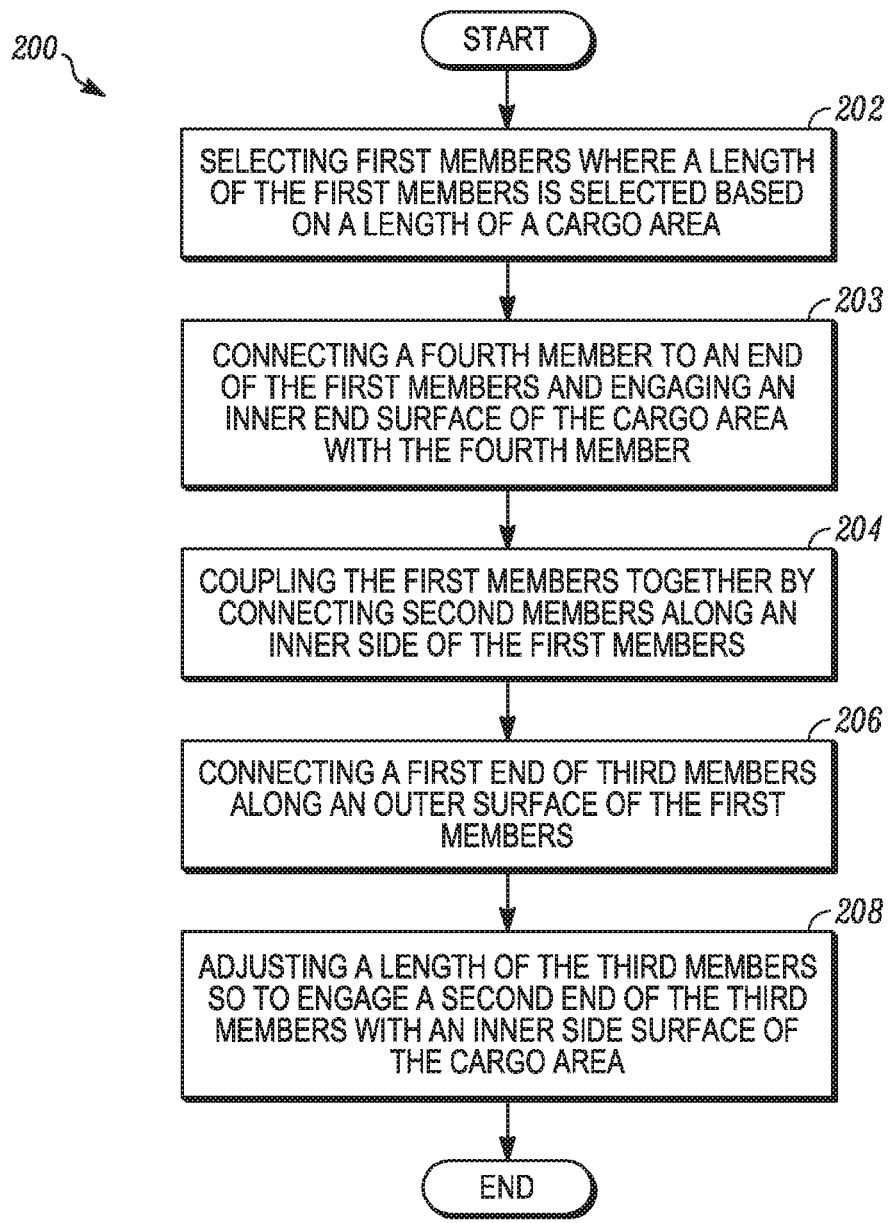
FIG. 12 is a flowchart that illustrates an example of a method for preventing items sliding around a cargo area of a vehicle, according to an embodiment.

FIG. 12 is a flowchart illustrates an example of a method 200 for preventing items sliding around a cargo area of a vehicle. Although steps are depicted in FIG. 12 as integral steps in a particular order for purposes of illustration, in other embodiments, one or more steps, or portions thereof, are performed in a different order, or overlapping in time, in series or in parallel, or are omitted, or one or more additional steps are added, or the method is changed in some combination of ways.

In step 202, one or more center supports 102a, 102b are selected, where a length of the center supports 102a, 102b is selected based on a length of the cargo area. In one embodiment, the length of the center supports 102a, 102b is selected where the length of the center supports is about equal to (e.g. within about 2" or in a range from about 1" to about 4") a length of the cargo area. In other embodiments, where the length of the cargo area 150 exceeds the length of the center supports 102a, 102b by a threshold amount (e.g. 1'), the second center supports or rear extensions 103 are also selected and are connected to an end of the center supports 102a, 102b so that the collective length of the center supports 102a, 102b and the rear extensions 103 are about equal to a length of the cargo area. In an example embodiment, the cargo area 150 is a bed of a pickup truck that is one of a plurality of discrete lengths (e.g. 5', 6', 7', 8'). In one embodiment, step 202 involves selecting center supports 102a, 102b of a first length (e.g. 5') to accommodate the bed of one length (e.g. 5'). In another embodiment, step 202 involves selecting center supports 102a, 102b of the first length and a rear extension of a first length (e.g. 1') to accommodate the bed of another length (e.g. 6'). In another embodiment, step 202 involves selecting center supports 102a, 102b of the first length and a rear extension of a second length (e.g. 2') to accommodate the bed of another length (e.g. 7'). In another embodiment, step 202 involves selecting center supports 102a, 102b of the first length and a rear extension of a third length (e.g. 3') to accommodate the bed of another length (e.g. 8').

In step 203, middle supports 109a, 109b are connected to an end of the center supports 102a, 102b. In an embodiment, the tongue 120 at the end of the center supports 102 is received in the spaced apart grooves 113 along the interior length of the middle supports 109a, 109b. In another embodiment, fasteners 190a", 190b" are passed through openings 195a", 195b" along the middle supports 109a", 109b" and into an end of the center supports 102 aligned with the openings 195a", 195b".

In step 204, the center supports 102a, 102b selected in step 202 are coupled together using the center support members 104a, 104b, 104c. In an embodiment, the center supports 102a, 102b are coupled together by connecting the center support members 104a, 104b, 104c along the inner side 110 (e.g. in one of the grooves 113b) of the center supports 102a, 102b. In another embodiment, the center supports 102a, 102b are coupled together by passing fasteners 190a", 190b" through openings 195a", 195b" in the outer side 112 and into an end of the center support members 104a", 104b", 104c" aligned with the openings 195a", 195b". In an embodiment, step 204 results in the center supports 102a, 102b having a parallel alignment with respect to each other and the center supports members 104a, 104b, 104c having an orthogonal alignment with respect to the center supports 102a, 102b.

In step 206, a first end of the side members 106, 108 are connected along the outer surface 112 (e.g. in grooves 113a) of the center supports 102a, 102b. In another embodiment, the first end of the side members 106, 108 are secured to the outer surface 112 of the center supports 102a, 102b by passing fasteners 190a", 190b" through openings 195a", 195b" along the outer surface 112 and into an end of the side members 106, 108 aligned with the openings 195a", 195b". In an embodiment, step 206 involves connecting the side members 106 along the outer surface 112 of the center supports 102a, 102b in the first region of the cargo area 150 (e.g. with the wheel wells 152a, 152b). In another embodiment, step 206 involves connecting the side members 108 along the outer surface 112 of the center supports 102a, 102b in the second region of the cargo area 150 (e.g. between the wheel wells and the tailgate 158b) and/or so to not block the interior compartment doors 154a, 154b.

In step 208, a length of the side members 106, 108 are adjusted to engage a second end of the side members with the inner side surface 162a, 162b of the cargo area 150. In an example embodiment, a length 180a of the side piece 124 is about 12" or in a range from about 10" to about 14" and a length 180a' of the side piece 124' is about 6" or in a range from about 4" to about 8". Similarly, in an example embodiment, a length 184a of the side insert 126 is about 9" or in a range from about 7" to about 11" and a length 184a' of the insert 126' is about 5" or in a range from about 3" to about 7". In an embodiment, where the side members 106, 108 have an adjustable length using the slidable insert 126 with the quick release pin, the position of the insert 126 within the recess 130 of the side piece 124 is adjusted until the end of the side members 106, 108 engage the inner side surface 162a, 162b of the cargo area 150. In an embodiment, the range of adjustment of the side members 106, 108 is about 9" or in a range from about 6" to about 12" and/or in a range from about 3" to about 20". In another embodiment, where the side members 106", 108" (FIGS. 13A-13C) have a fixed length, step 208 is omitted and replaced with a step of selecting the side members 106", 108" from among side members with different fixed lengths so that the selected side members 106", 108" have fixed lengths that engage the inner side surface 162a, 162b of the cargo area 150 when connected to the center supports 102.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. Throughout this specification and the claims, unless the context requires otherwise, the word "comprise" and its variations, such as "comprises" and "comprising," will be understood to imply the inclusion of a stated item, element or step or group of items, elements or steps but not the exclusion of any other item, element or step or group of items, elements or steps. Furthermore, the indefinite article "a" or "an" is meant to indicate one or more of the item, element or step modified by the article. As used herein, unless otherwise clear from the context, a value is "about" another value if it is within a factor of two (twice or half) of the other value. While example ranges are given, unless otherwise clear from the context, any contained ranges are also intended in various embodiments. Thus, a range from 0 to 10 includes the range 1 to 4 in some embodiments.

What is claimed is:

1. An assembly for preventing items sliding around a cargo area of a vehicle, said assembly comprising:
   a plurality of first members, wherein a length of the first members is based on a length of the cargo area;
   a plurality of second members connected to an inner side of the plurality of first members to couple the first members together; and
   a plurality of third members with a first end connected to an outer side of the plurality of first members, wherein a length of the third members is selected so that a second end of the third members is configured to engage an inner side surface of the cargo area, wherein the plurality of third members include a third member with a first length and a third member with a second length greater than the first length, wherein the third member with the first length is selected to engage the inner side surface in a first region of the cargo area and the third member with the second length is selected to engage the inner side surface in a second region of the cargo area and wherein a width of the cargo area is greater in the second region than in the first region.

2. An assembly as recited in claim 1, wherein the plurality of first members are connected end to end so that a collective length of the plurality of first members is based on the length of the cargo area.

3. An assembly as recited in claim 2, wherein the plurality of first members are connected end to end using a tongue and groove arrangement.

4. An assembly as recited in claim 2, wherein the plurality of first members are connected end to end using a connector plate and a plurality of fasteners configured to pass through a respective plurality of openings defined by the connector plate.

5. An assembly as recited in claim 1, wherein the plurality of first members are oriented parallel to each other after being coupled together with the plurality of second members.

6. An assembly as recited in claim 5, wherein the plurality of second members are connected to the inner side of the plurality of first members with a tongue and groove arrangement.

7. An assembly as recited in claim 5, wherein the plurality of second members are connected to the inner side of the plurality of first members using a pair of fasteners secured through the inner side and into an end of the plurality of second members so to form a plurality of interior areas defined by the first members and the second members and wherein the plurality of interior areas are sized to hold items.

8. An assembly as recited in claim 1, further comprising at least one fourth member connected to an end of the plurality of first members, said at least one fourth member configured to engage an inner end surface of the cargo area.

9. An assembly as recited in claim 8, wherein the at least one fourth member is connected to the end of the plurality of first members with a pair of fasteners that are secured through the fourth member and into the end of the plurality of first members.

10. An assembly as recited in claim 8, wherein the at least one fourth member has a fixed length that is selected so that opposite ends of the fourth member are configured to engage the inner side surface of the cargo area adjacent the inner end surface.

11. An assembly as recited in claim 8, wherein the at least one fourth member has a length that is less than a width of the cargo area.

12. An assembly as recited in claim 1, wherein the plurality of third members have a fixed length that is selected so that the second end of the third members is configured to engage the inner side surface of the cargo area.

13. An assembly as recited in claim 1, wherein the vehicle is a pickup truck, wherein the cargo area is a bed of the pickup truck, wherein the inner side surface in the first region is a wheel well and wherein the inner side surface in the second region is between the wheel well and a tailgate of the pickup truck.

14. An assembly as recited in claim 1, wherein the vehicle is a sport utility vehicle (SUV) and wherein the cargo area is an interior cargo area of the SUV.

15. An assembly as recited in claim 1, wherein a height of at least one of the first members, the second members and the third members is in a range from about 4 inches to about 9 inches.

16. A method for preventing items sliding around a cargo area of a vehicle, said method comprising:
   a. selecting a plurality of first members, wherein a length of the first members is selected based on a length of the cargo area;
   b. coupling the plurality of first members by connecting a plurality of second members along an inner side of the plurality of first members;
   c. connecting a first end of a plurality of third members along an outer side of the plurality of first members; and
   d. selecting a length of the third members so to engage a second end of the plurality of third members with an inner side surface of the cargo area, wherein step c. comprises connecting the first end of the plurality of the third members at first and second locations along the plurality of first members corresponding to respective first and second regions of the cargo area, wherein step d. comprises selecting the length of the third members so that the second end of the plurality of the third members engages the inner side surface in the first and second regions of the cargo area, wherein the vehicle is a pickup truck, wherein the cargo area is a bed of the pickup truck, wherein the first region comprises a wheel well and the second region is between the wheel well and a tailgate of the pickup truck, and wherein step d. comprises selecting the length of the third member in the first region to be less than the length of the third member in the second region, and wherein the second region includes an interior compartment door and wherein the method further comprises adjusting a position of the third member in the second region to not block access to the interior compartment door.

17. A method as recited in claim 16,
wherein step a. comprises connecting the plurality of first members end to end so that a collective length of the plurality of first members is about the length of the cargo area;
wherein step b. comprises orienting the plurality of first members parallel to each other and connecting the plurality of second members along the inner side of the plurality of first members so that the plurality of second members are about orthogonal to the plurality of first members.

18. A method as recited in claim 16, further comprising:
connecting at least one fourth member to an end of the plurality of first members and engaging an inner end surface of the cargo area with the at least one fourth member; and
selecting a length of the at least one fourth member so that opposite ends of the fourth member engages the inner side surface of the cargo area adjacent the inner end surface.

* * * * *